(12) United States Patent
Lee et al.

(10) Patent No.: US 9,179,048 B2
(45) Date of Patent: Nov. 3, 2015

(54) CAMERA MODULE

(71) Applicant: OPTIS CO., LTD., Suwon-si (KR)

(72) Inventors: Ju Hyung Lee, Suwon-si (KR); Kyung Sik Shin, Yongin-si (KR); Jeen Gi Kim, Seoul (KR); Jong Ryull Kim, Yongin-si (KR)

(73) Assignee: OPTIS CO., LTD., Suwon-si (KR)

( * ) Notice: Subject to any disclaimer, the term of this patent is extended or adjusted under 35 U.S.C. 154(b) by 0 days.

(21) Appl. No.: 14/102,822

(22) Filed: Dec. 11, 2013

(65) Prior Publication Data

US 2014/0333829 A1    Nov. 13, 2014

(30) Foreign Application Priority Data

May 8, 2013    (KR) .......................... 10-2013-0051633

(51) Int. Cl.
| | |
|---|---|
| H04N 5/225 | (2006.01) |
| G02B 7/02 | (2006.01) |
| G02B 7/04 | (2006.01) |
| G02B 7/08 | (2006.01) |
| G02B 7/09 | (2006.01) |
| G03B 3/10 | (2006.01) |
| G03B 17/12 | (2006.01) |
| H04N 5/232 | (2006.01) |

(52) U.S. Cl.
CPC .............. *H04N 5/2251* (2013.01); *G02B 7/026* (2013.01); *G02B 7/04* (2013.01); *G02B 7/08* (2013.01); *G02B 7/09* (2013.01); *G03B 3/10* (2013.01); *G03B 17/12* (2013.01); *H04N 5/2254* (2013.01); *H04N 5/2257* (2013.01); *H04N 5/23241* (2013.01); *G03B 2205/0015* (2013.01); *G03B 2205/0046* (2013.01); *G03B 2205/0069* (2013.01)

(58) Field of Classification Search
CPC .......................... H04N 5/2254; H04N 5/2257
USPC .................................................. 348/335, 374
See application file for complete search history.

(56) References Cited

U.S. PATENT DOCUMENTS

| | | | |
|---|---|---|---|
| 6,389,231 B1* | 5/2002 | Onda .............................. 396/83 |
| 2004/0257926 A1* | 12/2004 | Shima et al. ................ 369/44.14 |
| 2006/0147190 A1* | 7/2006 | Topliss et al. ................. 396/133 |
| 2009/0225453 A1* | 9/2009 | Chang ........................... 359/824 |
| 2009/0279190 A1* | 11/2009 | Chou ............................. 359/814 |

* cited by examiner

*Primary Examiner* — Gevell Selby
(74) *Attorney, Agent, or Firm* — NSIP Law

(57) ABSTRACT

Disclosed herein is a camera module. The camera module includes a bobbin unit, a suspension unit and a drive unit. The bobbin unit includes a stationary part which is fixed in a base, and a movable part which is provided so as to be movable relative to the stationary part, with a lens installed in the movable part. The opposite ends of the suspension unit are respectively connected to the stationary part and the movable part. The suspension unit includes a link unit which rotates when the movable part moves relative to the stationary part. The drive unit moves the movable part relative to the stationary part.

8 Claims, 13 Drawing Sheets

CAMERA MODULE

CROSS-REFERENCE TO RELATED PATENT APPLICATION

This application claims the benefit of Korean Patent Application No. 10-2013-0051633, filed on May 8, 2013, in the Korean Intellectual Property Office, the disclosure of which is incorporated herein in its entirety by reference.

BACKGROUND OF THE INVENTION

1. Field of the Invention

The present invention relates to a camera module which moves a lens.

2. Description of the Related Art

Generally, mobile phones are provided with high resolution compact camera modules having several megapixels. Differentiated high resolution compact digital camera modules require an auto-focusing function or optical zoom function to embody high image quality despite having a comparatively small size.

In conventional camera modules that have a comparatively low number of pixels, a lens group is fixed with respect to the direction of an optical axis so as to reduce the production cost or the size of a product. Therefore, conventional camera modules cannot embody an optical zoom function but can only adjust the magnification of the lens group in such a way (called a digital zoom function) that an electric signal of an optical image is enlarged by an image sensor and an image processing chip.

Although the auto-focusing function or the optical zoom function are already generalized in existing digital cameras, it is still difficult to embody them in compact digital camera modules that are reduced in size to several tens of millimeters in length and width. For example, when taking a picture in an afocal mode, the lens group must be fixed without moving. In a macro or close-up mode in which the lens group is close to a target when taking a picture, the lens group must move in the direction of the optical axis to conduct an auto-focusing function.

To realize the auto-focusing function or the optical zoom function in a compact camera module that is reduced in size, it is required to innovatively improve the drive mechanism including an actuator.

SUMMARY OF THE INVENTION

Accordingly, the present invention has been made keeping in mind the above problems occurring in the prior art, and an object of the present invention is to provide a camera module which can move a lens in a direction of an optical axis.

The technical object of the present invention is not limited to the above-mentioned object, and those skilled in this art will be able to easily understand other unmentioned objects from the following description.

In order to accomplish the above object, in an aspect, the present invention provides a camera module, including: a bobbin unit comprising a stationary part fixed in a base, and a movable part provided so as to be movable relative to the stationary part, with a lens installed in the movable part; a suspension unit respectively connected at opposite ends thereof to the stationary part and the movable part, the suspension unit comprising a link unit rotating when the movable part moves relative to the stationary part; and a drive unit moving the movable part relative to the stationary part.

In another aspect, the present invention provides a camera module, including: a bobbin unit comprising a stationary part fixed in a base, and a movable part provided so as to be movable relative to the stationary part, with a lens installed in the movable part; a suspension unit respectively connected at opposite ends thereof to the stationary part and the movable part, the suspension unit comprising a link unit rotating when the movable part moves relative to the stationary part; and a pre-load unit applying a pre-load to the movable part in a direction toward the base.

In a further aspect, the present invention provides a camera module, including: a bobbin unit comprising a stationary part fixed in a base, and a movable part provided so as to be movable relative to the stationary part, with a lens installed in the movable part; and a suspension unit respectively connected at opposite ends thereof to the stationary part and the movable part, the suspension unit comprising a link unit rotating when the movable part moves relative to the stationary part.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
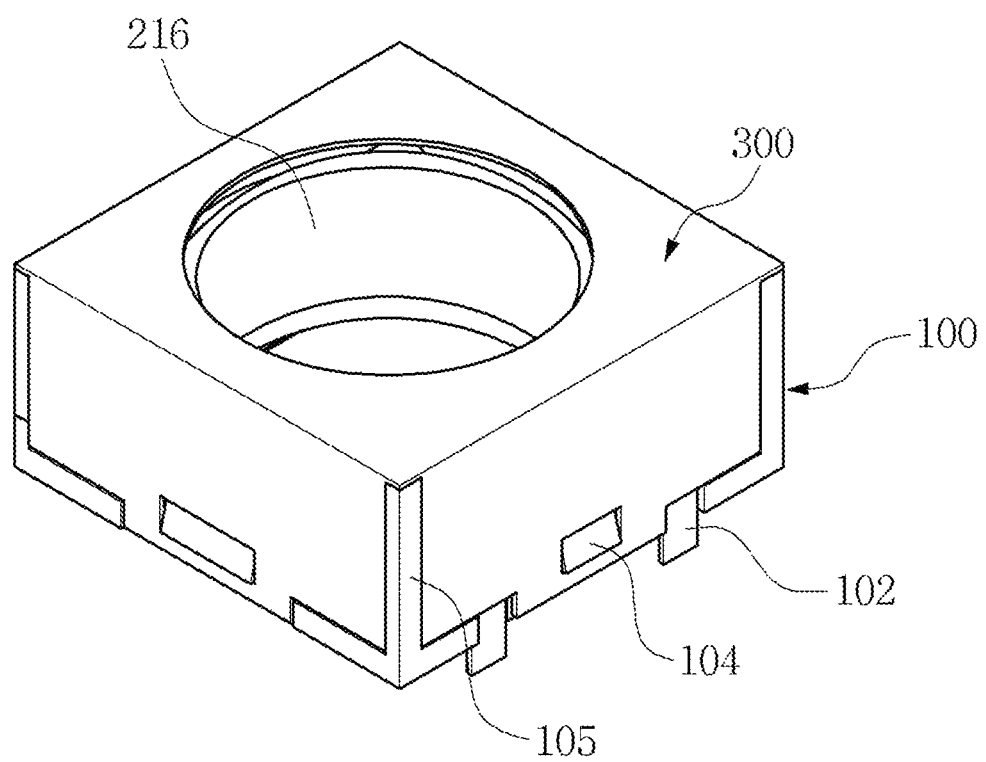
FIG. 1 is a perspective view showing the appearance of a camera module according to the present invention.

Hereinafter, a preferred embodiment of the present invention will be described in detail with reference to the attached drawings. The size, shape, etc. of each element may be exaggeratedly expressed in the drawings for the sake of understanding the present invention. The terms and words used for elements in the description of the present invention have been determined in consideration of the functions of the elements in the present invention. The terms and words may be changed depending on the intention or custom of users or operators, so that they must be defined based on the whole content of the specification of the present invention.

Figure 2:
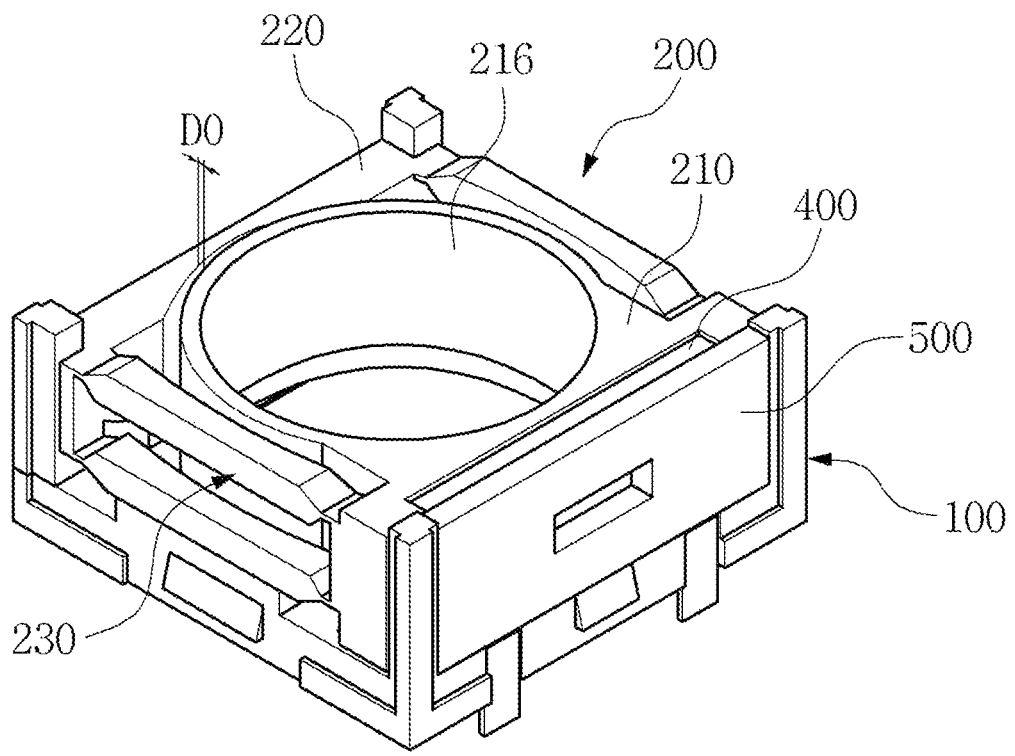
FIG. 2 is a partial perspective view showing the internal construction of the cameral module from which a cover has been removed according to the present invention.
Figure 3:
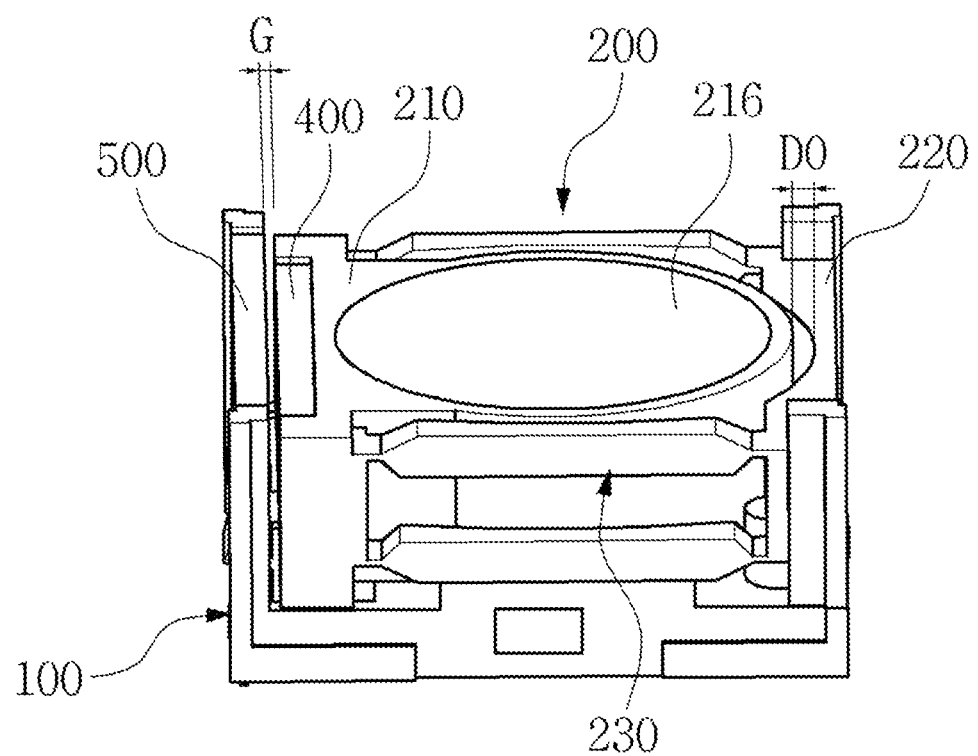
FIG. 3 is a partial perspective view illustrating the cameral module of FIG. 2, viewed from a different angle.
Figure 4:
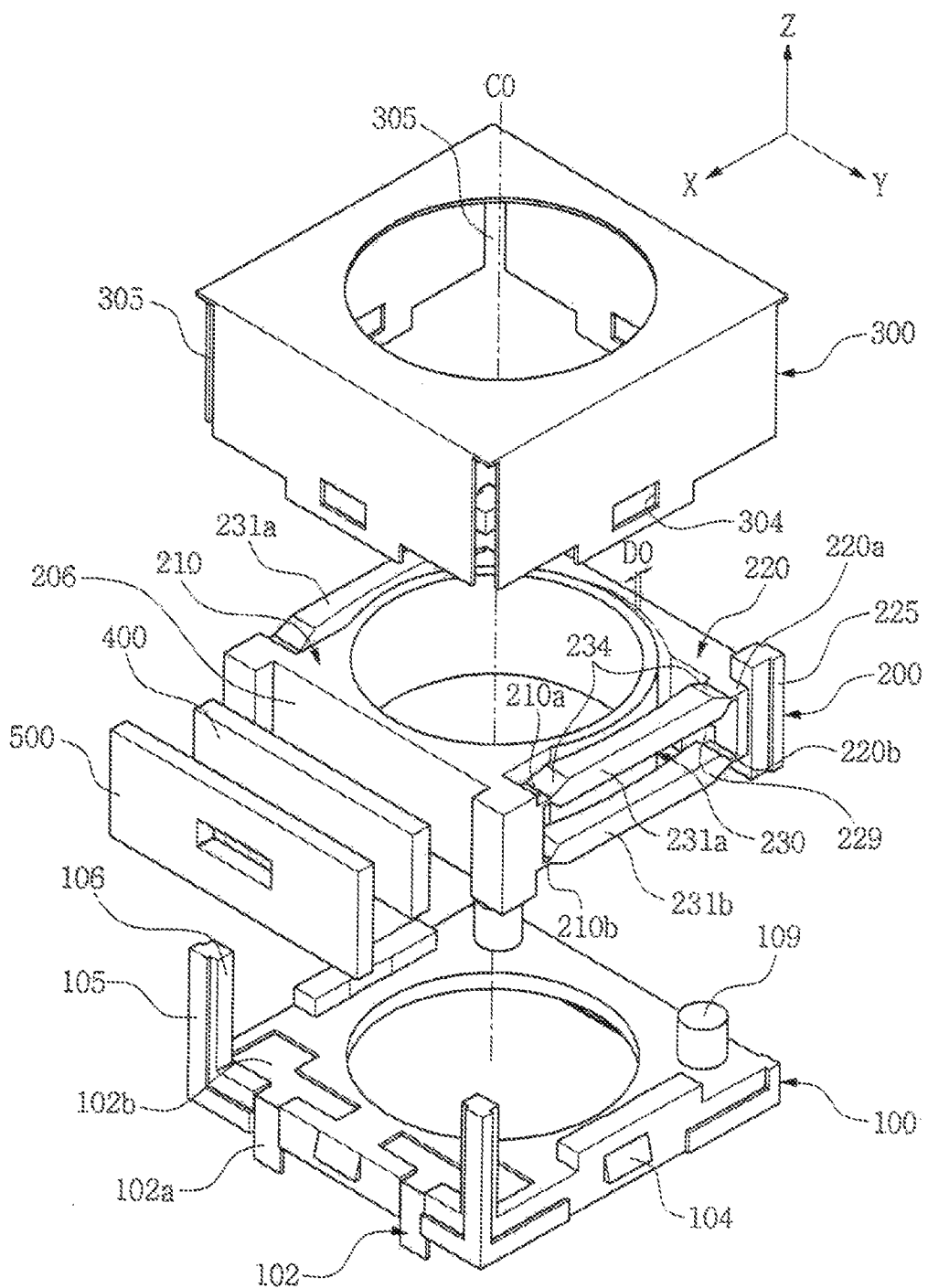
FIG. 4 is an exploded perspective view of the camera module according to the present invention.
Figure 5:
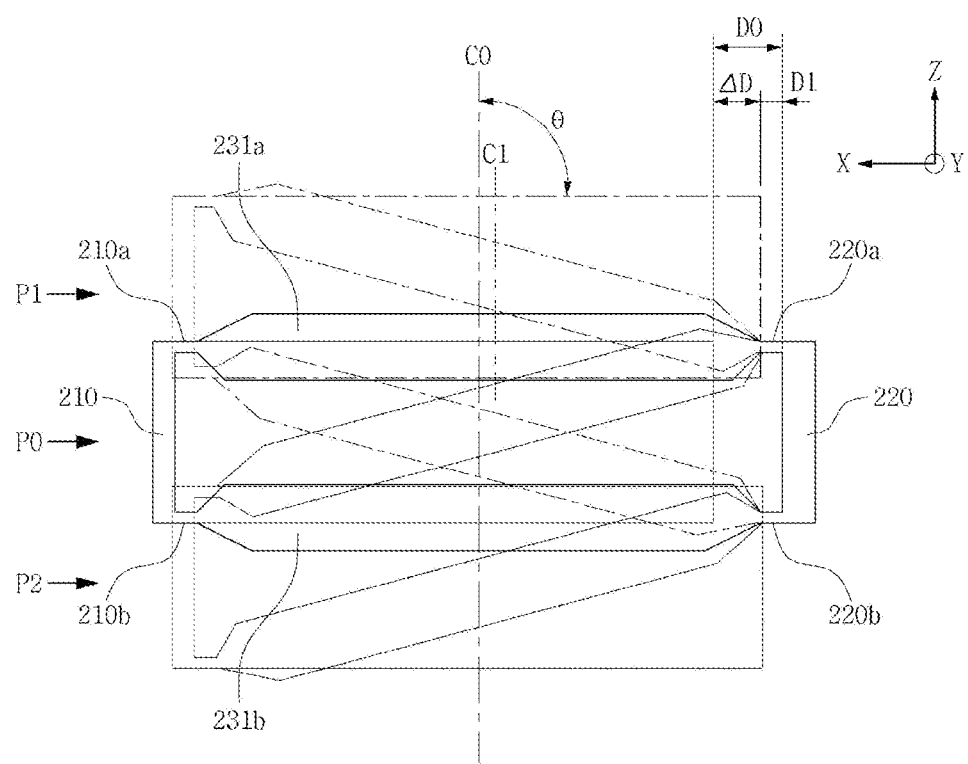
FIG. 5 is a side view schematically illustrating the operation of a bobbin unit according to the present invention.
Figure 6:
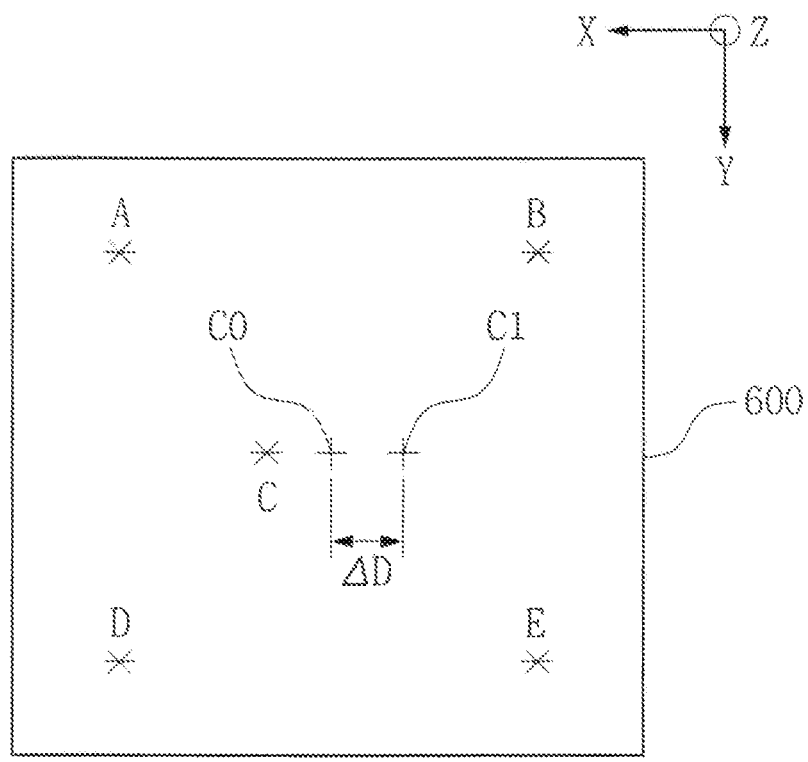
FIG. 6 is a view illustrating alignment between a camera module and an image sensor according to the present invention.

FIG. 1 is a perspective view showing the appearance of a camera module according to the present invention. FIG. 2 is a partial perspective view showing the internal construction of the cameral module from which a cover has been removed according to the present invention. FIG. 3 is a partial perspective view illustrating the cameral module of FIG. 2, viewed from a different angle. FIG. 4 is an exploded perspective view of the camera module according to the present invention. FIG. 5 is a side view schematically illustrating the operation of a bobbin unit according to the present invention. FIG. 6 is a view illustrating alignment between a camera module and an image sensor according to the present invention. The construction and operation of the camera module of the present invention will be described in detail with reference to FIGS. 1 through 6.

The camera module of the present invention includes a drive unit 400 and 500, a base 100 and a bobbin unit 200.

To achieve several purposes such as automatic focus adjustment, automatic magnification adjustment, image stabilization, etc., a structure capable of moving a lens in a direction of an optical axis (C0 of FIG. 4) is required. For the sake of clear explanation, a rectangular coordinate system is introduced, wherein the optical axis that corresponds to a center axis of the lens is defined as a Z-axis, and imaginary axes which form a plane perpendicular to the Z-axis are respectively defined as an X-axis and a Y-axis.

The drive unit 400 and 500 can move a movable part 210 and a stationary part 220, which form the bobbin unit 200, with respect to each other. The drive unit 400 and 500 can be embodied by a variety of methods, for example, using an actuator.

In an embodiment, the drive unit 400 and 500 may comprise a coil 500 and a magnet 400. The coil 500 and the magnet 400 can provide moving force to the lens in such a way that when power is applied thereto, electromagnetic force is generated. The coil 500 and the magnet 400 are respectively installed on the base 100 and the bobbin unit 200. A lens drive means in which the coil 500 is attached to the bobbin unit 200 and is moved along with the lens is called a 'moving coil type lens drive means', and a lens drive means in which the magnet 400 is attached to the bobbin unit 200 and is moved along with the lens is called a 'moving magnet type lens drive means'. Either the moving coil type or moving magnet type lens drive means can be used as the lens drive means of the present invention, and the moving magnet type lens drive means is used in the embodiment illustrated in the drawings. The coil 500 and the magnet 400 may be respectively installed on the stationary part 220 and the movable part 210 in the bobbin unit 200.

In the case of the moving magnet type lens drive means illustrated in the drawings, opposite ends of the coil 500 are attached to respective coil seating surfaces 106 of base pillars 105 that protrude from the base 100. An adhesive is preferably used to provide reliable adhesive force.

The magnet 400 which faces the coil 500 is attached to a magnet seating surface 206 formed in the movable part 210 of the bobbin unit 200. Referring to FIG. 3, spaced apart from each other by a predetermined distance G, the coil 500 and the magnet 400 face each other. The predetermined distance G is appropriate if the magnet 400 attached to the movable part 210 does not interfere with the coil 500 when the movable part 210 moves upwards, downwards, leftwards or rightwards.

The base 100 forms the appearance of the camera module. A cover 300 is coupled to the base 100. Either the coil 500 or the magnet 400 can be attached to the base 100. An opening formed in the base 100 faces an image sensor 600. Light reflected by a target enters the lens. Light that has entered the lens passes through the base 100 through the opening and reaches the image sensor 600 that is disposed below a lower surface of the base 100 with respect to the z-axial direction or in the lower surface of the base 100.

One of the characteristics of the present invention is that the bobbin unit 200 is integrally provided. The bobbin unit 200 has the stationary part 220 which is fixed to the base 100, and the movable part 210 in which the lens is installed. The bobbin unit 200 is configured such that the movable part 210 is connected to the stationary part 220 so as to be movable relative to the stationary part 220. The relative movement of the movable part 210 may move the movable part 210 in the optical axis C0 upwards or downwards relative to the stationary part 220.

The movable part 210 is connected to the stationary part 220 by suspension units 230. The suspension units 230 may be formed integrally with the movable part 210 and the stationary part 220 by a single mold at the same time. Alternatively, the suspension units 230 may be separately formed from the movable part 210 and the stationary part 220 before opposite ends of the suspension units 230 are respectively coupled to the movable part 210 and the stationary part 220. Therefore, unlike the conventional technique, despite providing no separate lens support means, the lens can be precisely supported by the connection structure of the suspension units 230 in the optical axial direction without tilting.

The bobbin unit 200 is fixed at a first side thereof to the base 100. A second side of the bobbin unit 200 is used as the place where the lens is installed. The bobbin unit 200 is configured such that the first side of the bobbin unit 200 that is fixed to the base 100 and the second side of the bobbin unit 200 in which the lens is installed can move relative to each other. Either the coil 500 or the magnet 400 is attached to the second side of the bobbin unit 200 in which the lens is installed, whereby electromagnetic force can be applied to the second side of the bobbin unit 200.

The stationary part 220 is a part that is fixed to the base 100, and the movable part 210 is a part to which either the coil 500 or the magnet 400 is attached and in which the lens is installed. The suspension units 230 function to elastically support the movable part 210 so that the movable part 210 can move with respect to the stationary part 220.

There is a marked advantage in that the stationary part 220, the movable part 210 and the suspension units 230 can be integrally formed by a single mold at the same time. The stationary part 220, the movable part 210 and the suspension units 230 may be formed of the same material, for example, synthetic resin, rubber, etc., or, alternatively, they may be formed using an insert mold or outsert mold by injection molding such that a metal material can be partially contained therein. As a further alternative, the stationary part 220, the movable part 210 and the suspension units 230 may be provided in such a way that they are formed as separate parts and then coupled to each other.

In an embodiment, referring to FIG. 4, the stationary part 220 fixed to the base 100 has a stationary part coupling hole 229 and stationary part pillars 225. A stationary part coupling rod 109 protrudes from the base 100. When the base 100 and the stationary part 220 are assembled with each other, they can be guided to a correct assembly position in such a way that the stationary part coupling rod 109 is inserted into the stationary part coupling hole 229. An additional UV adhesive or thermosetting adhesive is applied to coupling surfaces between the base 100 and the stationary part 220, thus providing vibration resistance and shock resistance. The stationary part pillars 225 function to guide the cover 300 when the cover 300 is assembled with the bobbin unit 200 and the base 100. Among four guide slots 305 formed in the respective corners of the cover 300, two guide slots 305 that correspond to the stationary part pillars 225 are fitted over the respective stationary part pillars 225.

The cover 300 receives the bobbin unit 200, the coil 500 and the magnet 400 therein and is coupled to the base 100. If the cover 300 is made of a magnetic substance such as metal, it can also function as a yoke which prevents magnetic flux leakage.

Hook slots 304 are formed in the cover 300. The hook slots 304 are locked to respective hooks 104 which are provided on the base 100, thus preventing the cover 300 from being undesirably removed from the base 100. Some of the guide slots 305 that are formed in the cover 300 are fitted over the base pillars 105 that protrude from the base 100, thus guiding the assembly position of the cover 300.

The movable part 210 has a lens seating surface 216 onto which the lens is placed, and the magnet seating surface 206 onto which the magnet 400 is seated. To reduce installation space, a portion in which the lens seating surface 216 is disposed is cylindrical, and a portion in which the magnet seating surface 206 is disposed is planar.

According to the rectangular coordination system of the camera module shown in FIGS. 4 through 6, the optical axis C0 is the Z-axis. The coil 500 and the magnet 400 have surfaces which extend perpendicular to the X-axis and face each other with respect to the direction perpendicular to the X-axis.

The suspension units 230 are respectively disposed at first and second sides of the X-axis and form an axial symmetric structure based on the X-axis. This restricts generation of rotational moment having the X-axis as a center axis, whereby even if the movable part 210 moves, a tilting angle θ of the movable part 210 with respect to the optical axis C0 can be maintained constant.

Although not shown in the drawings, in the same manner, if the coil 500 and the magnet 400 face each other in the direction perpendicular to the Y-axis, the suspension units 230 are respectively disposed at first and second sides of the Y-axis and form an axial symmetric structure based on the Y-axis.

Each suspension unit 230 includes first and second links 231a and 231b, opposite ends of which are respectively connected to the stationary part 220 and the movable part 210. The first link 231a and the second link 231b are spaced apart from each other in the direction of the optical axis C0. Although in this embodiment the two links 231a and 231b have been illustrated as being provided at each of both sides of the bobbin unit 200, the structure in which the movable part 210 can maintain the tilting angle θ constant while moving can be embodied so long as two or more links are provided at each side of the bobbin unit 200.

FIG. 5 illustrates a structure in which, in each of the first and second sides of the bobbin unit 200, the suspension unit 230, the stationary part 220 and the movable part 210 form a parallelogram when the movable part 210 is moving. That is, an imaginary parallelogram, which has the first link 231a and the second link 231b as a pair of facing sides and has the stationary part 220 and the movable part 210 as another pair of facing sides, is formed. Thereby, the movable part 210 can maintain the tilting angle θ with respect to the optical axis C0 constant while moving relative to the stationary part 220.

In each of the first and second sides of the bobbin unit 200, four hinge parts 210a, 210b, 220a and 220b are provided at positions which the opposite ends of the first links 231a and the opposite ends of the second link 231b are connected to the stationary part 220 and the movable part 210.

The cross-sectional area of each hinge part 210a, 210b, 220a, 220b is smaller than that of the first link 231a or the second link 231b. When the movable part 210 moves, the hinge parts 210a, 210b, 220a and 220b are elastically changed in shape before the first link 231a and the second link 231b are. Therefore, a reduced-thickness part 234 is formed in each of the junctions between the opposite ends of the first and second links 231a and 231b and the hinge parts 210a, 210b, 220a and 220b. Each reduced-thickness part 234 has an inclined surface structure, which is gradually reduced in thickness from one end thereof to the other end, so as to prevent crack or fatigue failure.

By virtue of the above-mentioned structure, like when the weight of the bobbin unit 200 is comparatively small, when voltage which is applied to the coil 500 is comparatively small, when the movable part 210 must be moved by a fine displacement, or when the acceleration at which the movable part 210 moves is comparatively high, elastic deformation of the hinge parts 210a, 210b, 220a and 220b which have more sensitive elasticity than that of the first link 231a or the second link 231b makes it possible to achieve the above-mentioned various control purposes and markedly improve the control sensitivity and the position-following performance of the movable part 210.

Referring to FIG. 4, when viewed from the direction of the optical axis C0, the coil 500 and the magnet 400 are disposed at a position displaced from the optical axis C0 to one side. Unlike a conventional technique in which several coils and magnets are arranged at predetermined angles around the periphery of a bobbin, in the present invention, it is sufficient if the coil 500 and the magnet 400 are disposed on only one side of the bobbin unit 200. Therefore, this structure can contribute greatly to reducing the number of parts of the lens drive means and the production cost.

The drive unit 400 and 500 can be embodied in various ways rather than being limited to the coil 500 and the magnet 400 illustrated in the drawings. For example, the drive unit 400 and 500 may comprise a memory alloy, an ultrasonic vibrator or the like, although this is not shown in the drawings.

Each suspension unit 230 has a shape of a both-end supported beam, the opposite ends of which are respectively connected to the stationary part 220 and the movable part 210. The suspension units 230 elastically support the movable part 210 in such a way that they are bent by electromagnet force applied between the coil 500 and the magnet 400. In detail, in the embodiment in which the suspension unit 230 includes the hinge parts 210a, 210b, 220a and 220b, the parts that are bent by electromagnet force are the hinge parts 210a, 210b, 220a and 220b.

The first link 231a and the second link 231b have much higher strength than that of the hinge parts 210a, 210b, 220a and 220b so that the first and second links 231a and 231b along with the stationary part 220 and the movable part 210 can reliably form a parallelogram shape and thus the tilting angle θ of the movable part 210 can be maintained constant.

Furthermore, the first link 231a and the second link 231b extend the same length and are rotated by the same angle by electromagnetic force generated between the coil 500 and the magnet 400. Thereby, the movable part 210 can maintain the tilting angle θ with respect to the optical axis C0 constant while moving relative to the stationary part 220.

As an imaginary embodiment for comparison with the present invention, if the cross-sectional area of each of the first and second links 231a and 231b is reduced to the same level as that of the hinge parts 210a, 210b, 220a and 220b such that the cross-sectional area of the suspension unit 230 is constant throughout the entire length, elastic deformation including bending deformation will occur in a wide range of the entire length of the suspension unit 230, thus making it difficult to maintain the tilting angle θ of the movable part 210 constant. In addition, there is a probability that the position responsibility of the movable part 210 becomes nonlinear.

Given this, in the present invention, each of the first and second links 231a and 213b has a comparatively large cross-section so that it can substantially act as a rigid body, and a portion where elastic deformation including bending deformation occurs is limited to the hinge parts 210a, 210b, 220a and 220b that are partially provided.

As a result, the manufacture and quality control of the bobbin unit 200 can be facilitated. A portion where quality control related to elasticity characteristics is required is limited to the hinge parts 210a, 210b, 220a and 220b, whereby elastic modulus deviation control can be facilitated. Moreover, by virtue of the rigidity of the first and second links 231a and 231b, the tilting angle θ of the movable part 210 can be reliably maintained constant.

Meanwhile, terminal units 102 are provided to supply power to the coil 500. Each terminal unit 102 includes an external extension 102a and an internal extension 102b. The external extension 102a extends outwards from the base 100 and is connected to an end of the coil 500 by soldering. The internal extension 102b extends towards the inside of the base 100 and pulls the magnet 400, which is attached to the movable part 210, towards the base 100, whereby the movable part 210 can begin to move from a state in which it has been maintained at the initial position. The terminal unit 102 having the above-mentioned shape becomes an embodiment a pre-load unit 102, 400 which is provided to maintain the lens at the initial position. The pre-load unit 102 and 400 can apply a pre-load to the movable part 210 in a direction towards the base 100. The direction towards the base 100 is a direction in which the lens approaches the image sensor 600.

In an embodiment, the pre-load unit includes the magnet and an attraction part which induces attraction force between it and the magnet using the pre-load. Either the magnet or the attraction part is installed on the movable part, and the other one of them is installed on the stationary part or the base.

For instance, the pre-load unit includes the magnet 400 which is installed on the movable part 210, and the attraction part which is installed on the stationary part 220 or the base 100 and induces attraction force between it and the magnet 400 using a pre-load. The attraction part may be a magnetic body such as another magnet which can interact with the magnet and generate attraction force. In this embodiment, the terminal unit 102 functions as the attraction part, and the magnet of the drive unit and the magnet of the pre-load unit are integrated with each other.

Furthermore, the pre-load unit may comprise an elastic member such as an elastic plate 700.

By virtue of the pre-load unit, when no power is applied to the coil 500 or when the camera module is not in operation, or when shock or vibration is applied to the camera module, the shock resistance of the movable part 210 with respect to the base 100 or the cover 300 can be enhanced. Further, when the camera module is operated, the pre-load unit makes it possible for the movable part 210 to begin to move at the initial position, whereby the position control can be facilitated.

The operation of the movable part 210 will be explained again in detail with reference to FIG. 5. Designated by reference numeral P0 and the thick solid line, the movable part 210 is at a neutral position. Reference numeral P2 and the thin solid line designate the movable part 210 that has been pulled towards the base 100 and is in an initial position. Reference numeral P1 and the alternated long and short dash line designate the movable part 210 which has been moved upward and is focusing or is in a magnification control operation.

A distance between the stationary part 220 and an end of the movable part 210 that faces the stationary part 220 is D0 when the movable part 210 is at the position P0. The distance is reduced to D1 at the position P1. The maximum value D0 of the distance is obtained when the movable part 210 is at the neutral position P0. As the movable part 210 moves upwards or downwards, the distance is reduced. Therefore, the distance between the stationary part 220 and the end of the movable part 210 is set in consideration of a height at which the movable part 210 moves upwards or downwards.

As shown in FIG. 5, it can be understood that despite movement of the movable part 210, the tilting angle θ of the movable part 210 with respect to the optical axis C0 can be maintained constant. Referring to FIG. 6, although a phenomenon in which the optical axis is shifted from C0 to C1 along the direction of the X-axis occurs, such a phenomenon in which the optical axis is shifted does not affect the quality of an image taken by the camera module, because the phenomenon does not distort the tilting angle θ of the lens and the image sensor 600.

In the future, it is expected that the number of pixels of a camera installed in a mobile terminal will continuously increase. If the number of pixels is increased, the control precision of the camera module becomes more sensitive and, particularly, is sensitive to the tilting angle. In the conventional technique, because compensation for the tilting angle depends on a thin metal plate spring, there is a problem in that when the lens moves upwards or downwards the tilting angle is unstable.

The present invention can easily control the quality of the suspension unit 230, which pertains to upward or downward movement of the lens. In addition, in the present invention, because the compensation for the tilting angle does not depend on a plate spring, not only can an assembly error be reduced but defective tilting can also be fundamentally prevented.

In the conventional technique, if the tilting angle of the movable part 210, to which the lens is coupled, with respect to the optical axis C0 is out of a predetermined range, distortion of an image taken by the camera is caused. That is, referring to FIG. 6, because the distances from the lens to different positions A, B, C, D and E of the image sensor 600 are varied, the focuses or magnifications at the positions A, B, C, D and E do not correspond to each other, or the angle between the image sensor 600 and the lens is warped, thus resulting in distortion of an image.

The problem of a defective tilting angle is caused by a unit tolerance of each element. Meanwhile, a defect that is called dynamic tilt is caused by an assembly tolerance which occurs when several elements are assembled with each other although the unit tolerance of each element is normal. However, the present invention is configured such that each link unit maintains a parallelogram shape while changing in shape. Therefore, the problem of a defective tilting angle attributable to a unit tolerance can be prevented, and dynamic tilt due to assembly tolerance can be fundamentally blocked.

Figure 7:
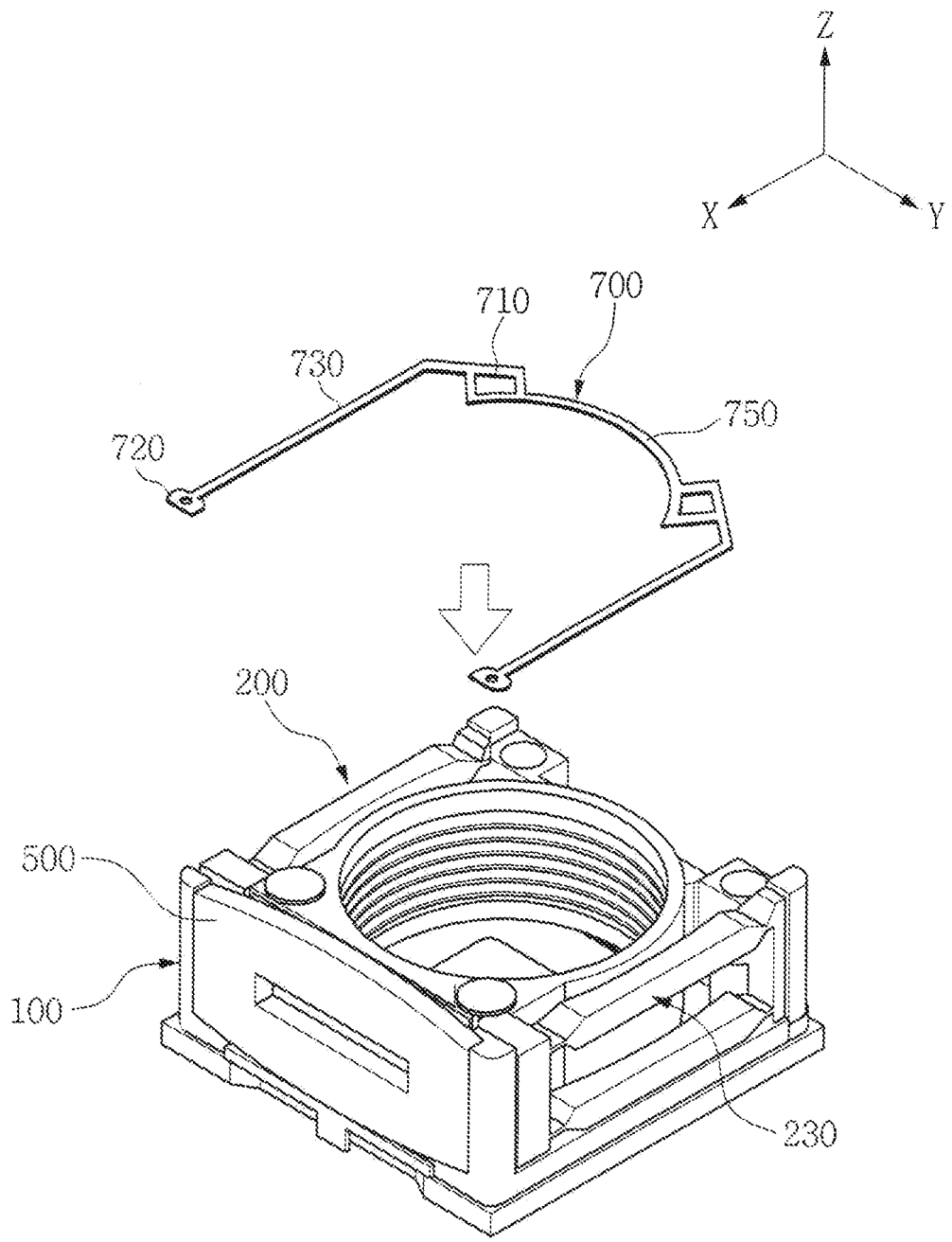
FIG. 7 is a view illustrating a camera module according to the present invention.
Figure 8:
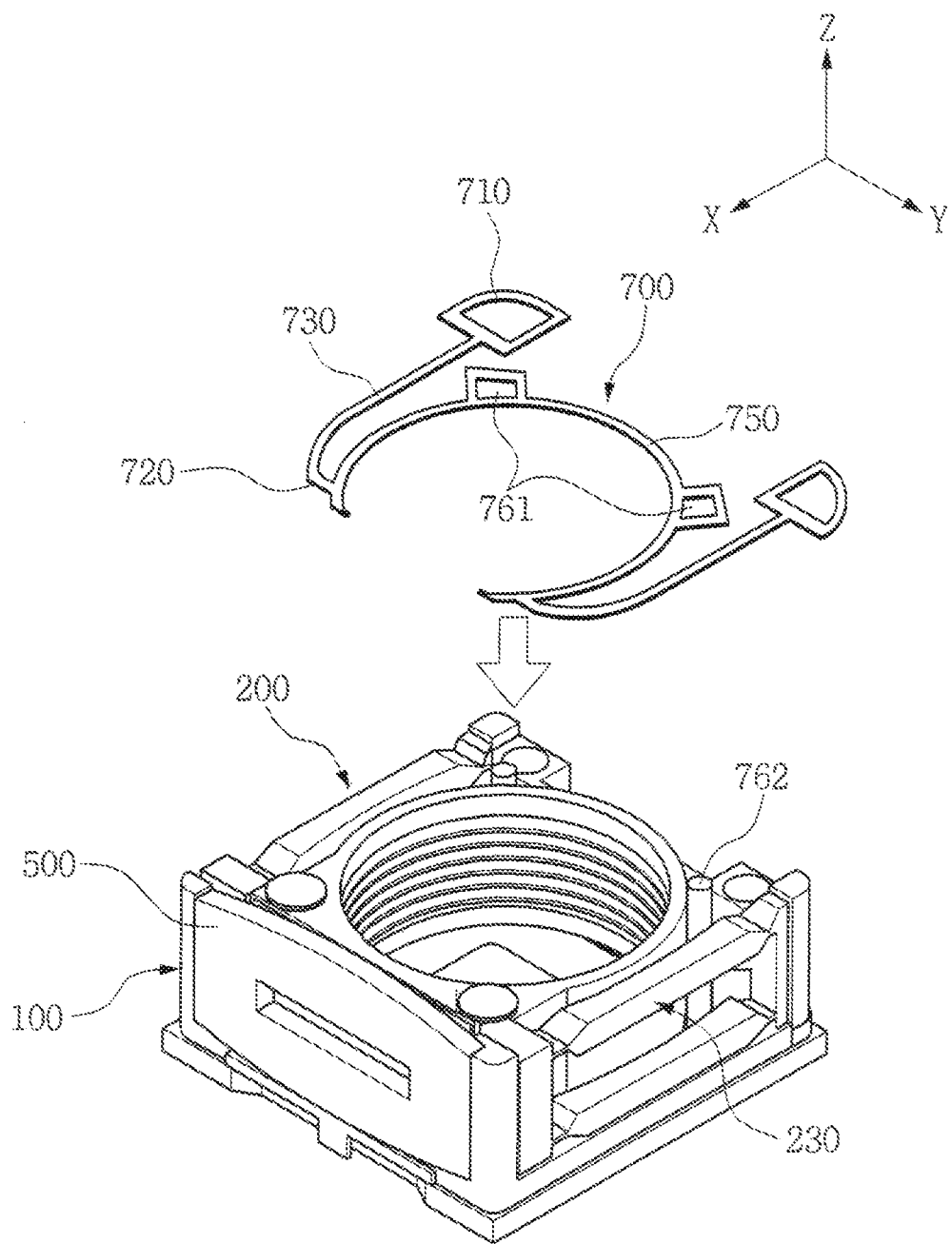
FIG. 8 is a view illustrating another camera module according to the present invention.

FIG. 7 is a view illustrating a camera module according to the present invention. FIG. 8 is a view illustrating another camera module according to the present invention.

The camera module of FIG. 7 or 8 includes a bobbin unit 200 and suspension units 230. In addition, an elastic plate 700 is provided in the camera module.

The bobbin unit 200 includes a stationary part 220 which is fixed on the base 100, and a movable part 210 which is moved relative to the stationary part 220 and in which a lens is installed.

Each suspension unit 230 includes a link unit 231a and 231b.

Opposite ends of the link unit 231a and 231b are respectively connected to the stationary part 220 and the movable part 210. The link unit 231a and 231b can be rotated when the movable part 210 moves relative to the stationary part 220. The link unit 231a and 231b can have a variety of shapes and comprise various numbers of links.

For example, the link unit 231a and 231b includes a first link 231a and a second link 231b. Opposite ends of each of the first and second links 231a and 231b are respectively connected to the stationary part 220 and the movable part 210. The first link 231a and the second link 231b are spaced apart from each other in the direction of the optical axis of the lens. When the movable part 210 moves relative to the stationary part 220, the first link 231a and the second link 231b rotate at the same angle. Here, the angle is an angle which is defined based on a direction perpendicular to the optical axis of the lens.

The distance between the opposite ends of the first link 231a is the same as the distance between the opposite ends of the second link 231b. The stationary part 220, the movable part 210 and the suspension unit may be formed by a single mold at the same time or, alternatively, they may be separately formed before being assembled with each other. The suspension units 230 are respectively disposed at first and second sides of the bobbin unit 200 when viewed in a plan view. FIG. 7 or 8 illustrates the suspension units that are respectively disposed at two positions which have different values with respect to the Y-axial direction.

The camera module includes a drive unit which moves the movable part 210 relative to the stationary part 220 in the direction of the optical axis of the lens and is disposed, based on the optical axis of the lens, on one side at which the link units 213a and 213b are connected to the movable part 210. The drive unit may include the coil and magnet that have been illustrated above. Alternatively, the drive unit may include a memory alloy, a solenoid, a piezo actuator, an ultrasonic vibrator or the like.

Hinge parts, each of which has a smaller cross-sectional area than that of that of the first link 231a or the second link 231b, are formed at respective positions at which the opposite ends of the first and second links 231a and 231b are connected to the stationary part 220 and the movable part 210. The hinge parts are elastically changed in shape when the movable part 210 moves.

Particularly, an imaginary parallelogram, which has the first link 231a and the second link 231b as a pair of facing sides and has the stationary part 220 and the movable part 210 as another pair of facing sides, is formed. Thereby, the movable part 210 can maintain the tilting angle with respect to the optical axis constant while moving relative to the stationary part 220.

Each of the first and second links 231a and 231b may be formed in a both-end supported beam shape in such a way that the opposite ends thereof are respectively connected to the stationary part 220 and the movable part 210.

According to the first link 231a and the second link 231b of the present invention, the problem pertaining to tilting can be reliably solved by the simple construction, as explained in the description of the embodiment of FIGS. 1 through 6.

The elastic plate 700 is installed between the stationary part 220 and the movable part 210. The elastic plate 700 provides elastic force to the movable part 210 in the direction of the optical axis of the lens. Here, the elastic force functions as a pre-load means which moves the movable part 210 in one direction of the optical axis of the lens. For example, the direction of a pre-load generated by the elastic plate 700 may be a direction in which the movable part 210 approaches the base 100.

The elastic plate 700 of the present invention does not only conduct the simple function of supporting the lens, unlike the plate spring (lens support means) of the conventional technique. The construction or shape of the elastic plate 700 also differs from those of the conventional plate spring. In an embodiment, the elastic plate 700 of the present invention functions as a pre-load means for applying a pre-load to the movable part 210. By virtue of the pre-load applied from the elastic plate 700 to the movable part 210, the movable part 210 can be disposed at the initial position or reference position when the drive unit is not in operation. As necessary, the elastic plate 700 may conduct only a function of supporting the movable part 210. This will be explained later herein.

The elastic plate 700 may be formed in a both-ends supported beam shape in which the opposite ends thereof are respectively connected to the stationary part 220 and the movable part 210. In detail, the elastic plate 700 includes a first coupling part 710, a second coupling part 720 and an elastic part 730.

The first coupling part 710 is coupled to the stationary part 220 fixed to the base 100.

The second coupling part 720 is coupled to the movable part 210 which can move relative to the stationary part 220 and in which the lens is installed.

The elastic part 730 connects the first coupling part 710 to the second coupling part 720 and is able to provide elastic force in the direction of the optical axis of the lens.

Referring to FIGS. 7 and 8, when viewed in the plan view, the width of the first coupling part 710 is greater than that of the elastic part 730 so that the first coupling part 710 can be reliably coupled to the stationary part 220. If a depression/hole or protrusion which is coupled to the first coupling part 710 is provided in the stationary part 220, a protrusion or depression/hole corresponding to the depression/hole or protrusion of the stationary part 220 is formed in the first coupling part 710. The second coupling part 720 has a greater width than that of the elastic part 730 when viewed in the plan view so that the second coupling part 720 can be reliably coupled to the movable part 210. If a depression/hole or protrusion which is coupled to the second coupling part 720 is provided in the movable part 210, a protrusion or depression/hole which corresponds to the depression/hole or protrusion of the movable part 210 is formed in the second coupling part 720. In the embodiment of FIG. 7, a first protrusion is provided on the stationary part 220, and a first hole into which the first protrusion is inserted is formed in the first coupling part 710. A second protrusion is provided on the movable part 210, and a second hole into which the second protrusion is inserted is formed in the second coupling part 720.

If a first surface of the stationary part 220 is fixed to the base 100, the first coupling part 710, the second coupling part 720 and the elastic part 730 are disposed facing to a second surface of the stationary part 220 that is opposite to the first surface. From the viewpoint of a stacked structure, the base 100—the stationary part 220—the first coupling part 710, the second coupling part 720 and the elastic part 730 are successively disposed.

In the case of the camera module, described earlier, including the bobbin unit and the suspension unit, the size of the camera module may be increased depending on installation space of the elastic plate 700. For example, if the elastic plate 700 is installed on a side surface of the camera module, the entire size of the camera module is naturally increased. To reduce the size of the camera module, the first coupling part 710, the second coupling part 720 and the elastic part 730 may be installed facing the first surface of the stationary part 220. From the viewpoint of a stacked structure, the first coupling part 710, the second coupling part 720 and the elastic part 730 may be disposed between the base 100 and the stationary part 220. However, in this case, the coupling of the first coupling part 710 to the movable part 210 and the coupling of the second coupling part 720 to the stationary part 220 are complicated, whereby a problem may be caused during a manufacturing process.

If the first coupling part 710, the second coupling part 720 and the elastic part 730 are disposed facing the second surface of the stationary part 220, an increase in the size of the camera module can be minimized.

If the drive unit which moves the movable part 210 in the direction of the optical axis of the lens is disposed at a position displaced from the optical axis to one side when viewed in the plan view, the second coupling part 720 is disposed at the side, at which the drive unit is disposed, based on the optical axis of the lens.

For example, when viewed in the plan view, if the drive unit is disposed at a position displaced from the optical axis to the left side among upper, lower, left and right sides, the second coupling part 720 can also be disposed at the left side. In this case, the second coupling part 720 that is coupled to the movable part 210 is disposed at the right side that is opposite to the left side.

In this structure, a longitudinal direction of a line that passes through the first coupling part 710 and the second coupling part 720 almost correspond to the longitudinal direction of the first link 231a or the second link 231b. Thereby, the first link 231a or the second link 231b can be prevented from being warped because of the elastic plate 700 while the first or second link 231a and 231b is operated. In summary, the first coupling part 710 is disposed at a position displaced from the optical axis of the lens to one side, and the second coupling part 720 is disposed at a position displaced from the optical axis of the lens to the other side.

To prevent a tilting problem resulting from the elastic plate 700 and reliably provide a pre-load, the first coupling part 710 preferably comprises a plurality of first coupling parts 710, and the second coupling part 720 also preferably comprises a plurality of second coupling parts 720. A first connection part 750 is provided to connect the first coupling parts 710 to each other, and a second connection part 760 is provided to connect the second coupling parts 720 to each other. By virtue of the first connection part 750 or the second connection part 760, the first coupling parts 710 or the second coupling parts 720 can be integrated with each other, whereby the assembly process can be further facilitated.

For example, in the camera module, two first coupling parts 710 and two second coupling parts 720 are provided, regarding the single movable part 210 and the single stationary part 220. Further, the camera module includes the first connection part 750 which connects the two first coupling parts 710 to each other.

In the case where the camera module includes the two first coupling parts 710 and the first connection part 750 which connects the two first coupling parts 710 to each other, the first connection part 750 has a shape corresponding to an outer circumferential surface of the movable part 210 and is disposed adjacent to the outer circumferential surface of the movable part 210 at a position spaced apart from the movable part 210. For example, in the embodiment of FIG. 7, the movable part 210 has a circular shape when viewed in the plan view, so that the first connection part 750 also has a circular shape. The diameter of the first connection part 750 is larger than that of the movable part 210, thus preventing the movement of the movable part 210 from being impeded by the first connection part 750. Furthermore, because the shape of the first connection part 750 corresponds to the outer circumferential surface of the movable part 210, an increase in the width of the camera module that results from the first connection part 750 can be minimized.

Meanwhile, when two second coupling parts 720 are provided for the movable part 210, the camera module may include the second connection part 760 which connects the two second coupling parts 720 to each other. As shown in FIG. 8, the second connection part 760 can be coupled to at least a portion of the movable part 210. In the embodiment of FIG. 8, the movable part 210 has a circular shape when viewed in the plan view. Corresponding to this, the second connection part 760 is formed along a circle which has the same diameter as that of the outer circumferential surface of the movable part 210. The second connection part 760 is disposed on the movable part 210 with respect to the Z-axial direction and is attached to the movable part 210 by a means such as adhesive. To more reliably couple the second connection part 760 to the movable part 210, a separate coupling means may be provided. In FIG. 8, two protrusions 762 extend from the movable part 210 in the Z-axial direction. Holes 761 which are fitted over the corresponding protrusions 762 are formed in the second connection part 760 in radial directions of the circle defined by the second connection part 760. According to the above-mentioned construction, because the protrusions 762 of the movable part 210 are inserted into the corresponding holes 761 of the second connection part 760, the assembly process can be facilitated, and the coupling force between the second connection part 760 and the movable part 210 can be enhanced.

Generally, the first coupling part 710, the elastic part 730 and the second coupling part 720 form a cantilever structure to which the first coupling part 710 is coupled. The elastic part 730 can provide elastic force that biases the first coupling part 710 in one direction of the optical direction of the lens.

According to the elastic plate 700 described above, the pre-load unit can have a simple and reliable structure and be embodied by a simple assembly process.

Meanwhile, the drive unit 400 and 500 moves the movable part 210 to the reference position when starting-up. After the movement of the movable part 210 to the reference position has been completed, the drive unit 400 and 500 moves the movable part 210 to a target position.

Figure 9:
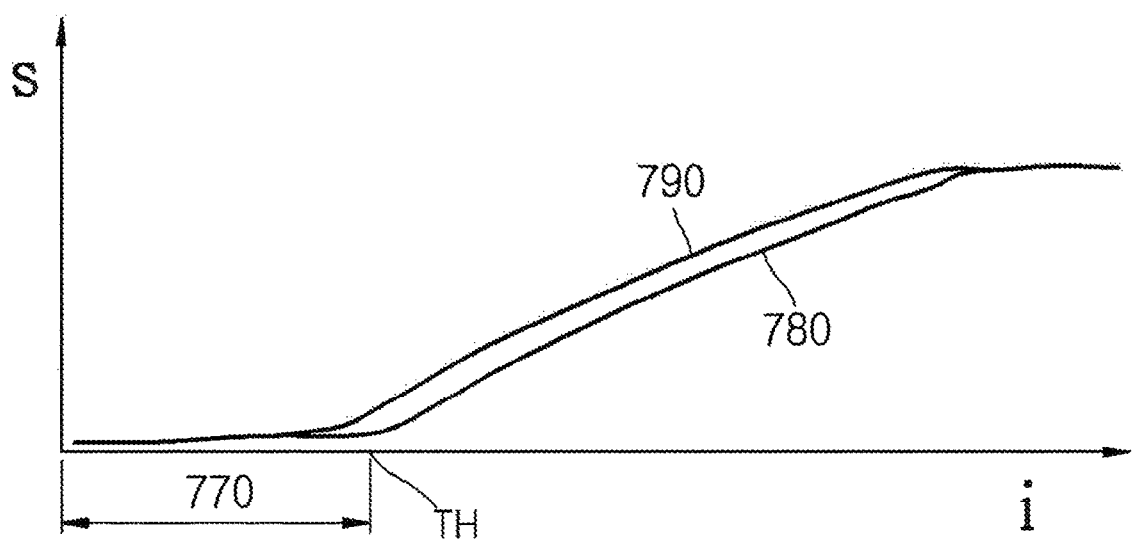
FIG. 9 is a graph showing drive characteristics of the drive unit of an imaginary comparative embodiment for comparison with the present invention.
Figure 10:
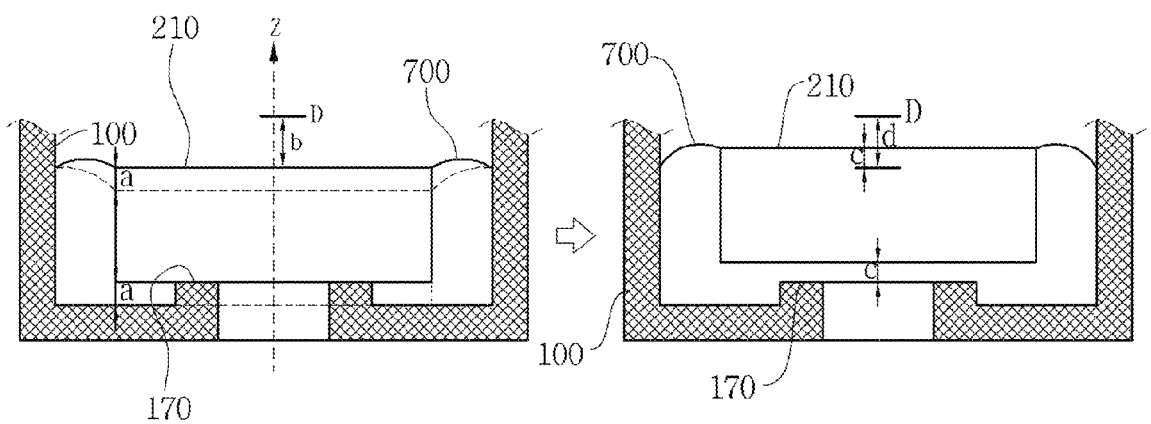
FIG. 10 illustrates a camera module provided with a pre-load means according to the present invention.

FIG. 9 is a graph showing drive characteristics of the drive unit of an imaginary comparative embodiment for comparison with the present invention. FIG. 10 illustrates the camera module provided with a pre-load means according to the present invention.

The elastic plate 700, described above, or the like can be used as the pre-load means. The drive unit may comprise an actuator. The horizontal axis of FIG. 9 designates current applied to the coil 500 which forms the actuator. The vertical axis of FIG. 9 designates an optical-axis-directional displacement of the bobbin unit 200 in which the magnet 400 that forms the actuator is installed.

Reference numeral 770 denotes a section in which the movable part 210 is pre-loaded by the pre-load means. When current which is less than a TH (threshold value) is applied to the coil 500, the bobbin unit 200 is restricted from moving and is maintained in a state in which it has been placed on a seating portion 170 provided on the base 100. The seating portion 170 may be provided on the stationary part 220.

Reference numeral 780 denotes a loading curve of the actuator. The loading curve of the actuator illustrates current-displacement characteristics of the actuator when the bobbin unit 200 moves forwards in the positive direction of the Z-axis as current applied to the coil 500 is increased. Reference numeral 790 denotes an unloading curve of the actuator. The unloading curve illustrates current-displacement characteristics of the actuator when the bobbin unit 200 moves backwards in the negative direction of the Z-axis as current applied to the coil 500 is reduced. A combination of the loading curve and the unloading curve forms a hysteresis curve that pertains to the drive characteristics of the actuator.

The movable part 210 moves from the reference position to a target position for auto-focusing or auto-zoom. The pre-load means for holding the movable part 210 in the reference position may have a structure using a magnet or, alternatively, it may have a structure using an elastic plate 700.

FIG. 10 illustrates the function of the pre-load means of the camera module. When the position at which the movable part 210 is placed on the seating portion 170 of the base 100 is the reference position, the elastic force of the elastic plate 700 may be used to dispose the movable part 210 at the reference position. The negative direction of the optical axis refers to a direction in which the movable part 210 moves from a free position, that is, from any position, to the reference position.

For example, when no external force is applied to the elastic plate 700, if the junction between the elastic plate 700 and the movable part 210 is disposed at a position spaced apart from the position of the seating portion 170 by a distance a in the negative direction of the optical axis, the movable part 210 can be reliably pre-loaded on the seating portion 170. In this case, the elastic force that the movable part 210 must overcome while being moved to a target position D spaced apart from the reference position by a distance b is increased.

The elastic force f can be expressed by the following equation 1.

$$f=kx \qquad \text{[Equation 1]}$$

Here, k denotes the modulus of elasticity, and x denotes a displacement.

According to Equation 1, elastic force of $f=ka$ is basically applied to the movable part 210 by the pre-load means in the negative direction of the optical axis. Therefore, to move the movable part 210 which has been in the state of being pre-loaded by the pre-load means, a force greater than at least $f=ka$ is required. That is, until force applied to the movable part 210 is increased to a level which is equal to or is greater than $f=ka$, the movable part 210 does not move. This state refers to a section 770 of FIG. 9.

In this state, to move the movable part 210 to the target position D, force of $f=ka+b$ is required. The force of $f=ka+b$ is provided by the actuator. This is directly related to power consumption resulting from the actuator.

Unlike the comparative embodiment provided with the pre-load means, in order to reduce power consumption resulting from the actuator, in lieu of using a separate pre-load means, the camera module of the present invention may be configured such that when the camera module is operated, the movable part 210 is moved from a free position to the reference position and then moved from the reference position to the target position. In this case, the elastic plate 700 functions as a means for supporting the movable part 210 connected to the suspension unit 230, rather than functioning as the pre-load means.

In other words, when an auto-focusing or auto-zoom function is required while the movable part 210 is disposed at a free position (that may be the reference position or any position other than the reference position), the movable part 210 is first moved to the reference position. After the movable part 210 has been completely moved to the reference position, it is moved to the target position.

In an embodiment, the camera module includes the movable part 210 which is provided with the lens that catches a target and focuses on it to form an optical image, the suspension unit 230 or the elastic plate 700 which movably supports the movable part 210, and the seating portion 170 which functions as the reference position at which the movable part 210 is disposed at the initial operation stage. In the drawings, although the movable part 210 has been illustrated being supported by the elastic plate 700, the movable part 210 may be supported by the suspension units 230 without using the elastic plate 700.

Before the initial operation stage, the movable part 210 may be disposed at a position spaced apart from the seating portion 170 or placed on the seating portion 170 by the elastic plate 700. Further, the seating portion 170 is formed on the base 100.

If the elastic plate 700 is set such that the movable part 210 is disposed at a free position spaced apart form the seating portion 170 by a distance c, the elastic plate 700 functions to support the movable part 210 at the free position in lieu of functioning as the pre-load means.

The movable part 210 is moved by the actuator to the seating portion 170 that corresponds to the reference position. The elastic force applied from the elastic plate 700 to the bobbin unit 200 is $f=kc$ that is obtained from Equation 1. The direction of the elastic force is the positive direction of the optical axis that is a direction towards a free position or target position. Therefore, to move the bobbin unit 200 in the negative direction of the optical axis that is a direction from the free position towards the reference position, a first power is supplied to the actuator. For example, the first power has a first polarity, and the power of the first polarity is negative (−) power.

The movable part 210 that has been moved to the reference position is moved to the target position D. The distance d that the movable part 210 is actually moved from the reference position to the target position is b, and elastic deformation of the elastic plate 700 is d−c. Therefore, elastic force that is applied from the elastic plate 700 to the movable part 210 at the target position can be expressed as an equation $f=k(d-c)$. Here, a second power is supplied to the actuator. For example, the second power has a second polarity that is opposite to the first polarity, and the power of the second polarity is positive (+) power.

However, the present invention is not limited to the above-mentioned explanation. For example, the first power may be positive (+) power as the first polarity, and the second power may be negative (−) power as the second polarity. That is, in the present invention that has no pre-load means, if the polarity of the first power by which the movable part 210 is moved from the free position to the reference position is different from that of the second power by which the movable part 210 is moved from the reference position to the target position, this can be an embodiment which falls within the bounds of the present invention. Because the bobbin unit 200 is moved upwards to the target position after being moved downwards to the reference position without using a separate pre-load means, power consumption can be reduced while auto-focusing, compared to the comparative embodiment using the pre-load means.

In the comparative embodiment provided with the pre-load means, the actuator must overcome elastic force of f=k (a+b). However, in the present invention that has no pre-load means, the actuator has only to overcome elastic force of f=k (d−c). Particularly, when the movable part 210 that has been moved to the target position is continuously auto-focused around the target position, the required magnitude of force is markedly reduced compared to that of the comparative embodiment provided with the pre-load means. By virtue of the above construction, the drive power of the actuator can be markedly reduced.

The movable part 210 is moved for auto-focusing to the target position based on the reference position. The actuator, when power is applied thereto, moves the movable part 210 in the direction of the optical axis. The camera module preferably includes a power unit 410 which applies power to the actuator.

Figure 11:
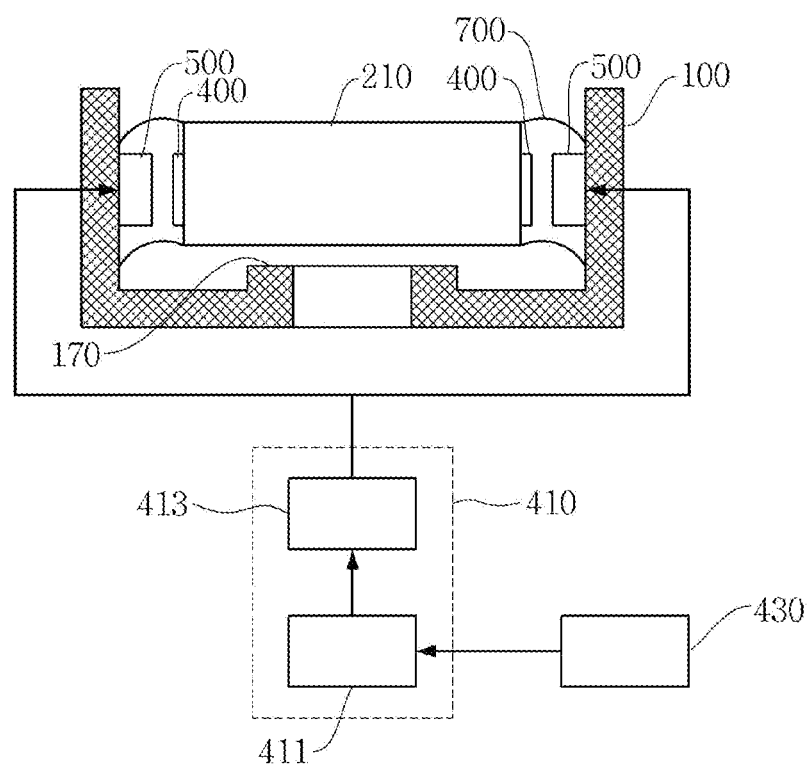
FIG. 11 illustrates a camera module provided with a power unit according to the present invention.

FIG. 11 illustrates the camera module provided with the power unit according to the present invention.

In the case where a voice coil actuator which includes a coil 500 to which power is applied and a magnet 400 disposed facing the coil 500 is provided as the actuator that is the drive unit, the power unit 410 supplies power to the coil 500.

To embody the movable part 210 that is configured such that the movable part 210, when it begins to be operated, is moved to the reference position and then moved to the target position, the power unit 410 can apply first power and second power to the actuator. The first power and the second power are different from each other in polarity or absolute value.

In detail, when the movable part 210 is operated, the power unit 410 may apply first power (e.g. negative (−) power) to the actuator and then apply second power (e.g. positive (+) power) thereto. Here, the first power can be applied by voltage or current of negative polarity which moves the movable part 210 towards the seating portion that is the reference position. The second power can be applied by voltage or current of positive polarity which moves the movable part 210 towards the target position, that is, in a direction away from the seating portion.

The power unit 310 includes a power generator 411 which generates power required to operate the bobbin unit 200 under the control of the control unit 430, and a polarity converter 413 which converts the polarity of the power generated from the power generator 411.

For example, the actuator, when negative (−) power that is the first power is applied thereto, moves the movable part 210 from a free position to the reference position. When positive (+) power that is the second power is applied to the actuator, it moves the movable part 210 from the reference position to the target position.

The above-stated embodiment is the case where the free position of the movable part 210 corresponds to the reference position or approximately corresponds to the reference position and the target position is disposed at a position farther from the seating portion than is the free position. That is, based on the seating portion, the reference position, the free position and the target position are successively arranged. In this case, the polarity of the first power which moves the movable part 210 downwards from the free position to the reference position is preferably different from the polarity of the second power which moves the bobbin unit upwards from the reference position to the target position.

Meanwhile, in an embodiment, the first power and the second power may have different absolute values while having the same polarity. In this case, the target position for auto-focusing is disposed between the free position and the reference position. Based on the seating portion, the reference position, the target position and the free position are successively arranged. If negative (−) power that moves the movable part 210 from the free position to the reference position is applied as the first power to the actuator, the second power which moves the movable part 210 from the reference position to the target position is negative (−) power that is the same polarity as the first power, and the absolute value of the second power is smaller than that of the first power. On the other hand, if positive (+) power that moves the movable part 210 from the free position to the reference position is applied as the first power to the actuator, the second power which moves the movable part 210 from the reference position to the target position is positive (+) power that is the same polarity as the first power, and the absolute value of the second power is smaller than that of the first power.

Given the arrangement sequence of the reference position, the target position and the free position, the actuator moves the movable part 210 to the reference position when first current having voltage of a first polarity is applied thereto. When second current having voltage of the first polarity or third current having voltage of second polarity is applied to the actuator, it moves the movable part 210 to the target position. The absolute value of the second current is smaller than that of the first current.

The actuator may move the movable part 210 to the reference position when the first current having negative voltage is applied as the first power of negative (−) polarity to the actuator. Further, the actuator may move the movable part 210 to the target position when the second current having negative voltage is applied as the second power of negative (−) polarity to the actuator or the third current having the positive voltage is applied as the second power of positive (+) polarity is applied thereto. Here, it is preferable that the absolute value of the second current be less than the absolute value of the first current.

Meanwhile, the actuator may move the movable part 210 to the reference position when the first current having negative voltage is applied as the first power of positive (+) polarity to the actuator. In addition, the actuator may move the movable part 210 to the target position when the second current having positive voltage is applied as the second power of negative (+) polarity to the actuator or the third current having the negative voltage is applied as the second power of positive (−) polarity is applied thereto. Preferably, the absolute value of the second current is less than the absolute value of the first current.

In an embodiment, the first power and the second power have different polarities, or if they have the same polarity, the absolute value of the second power is less than that of the first power.

The camera module includes the seating portion 170 on which the movable part 210 is placed when it is moved to the reference position. The seating portion 170 may be formed on the base 100 or the stationary part 220.

Figure 12:
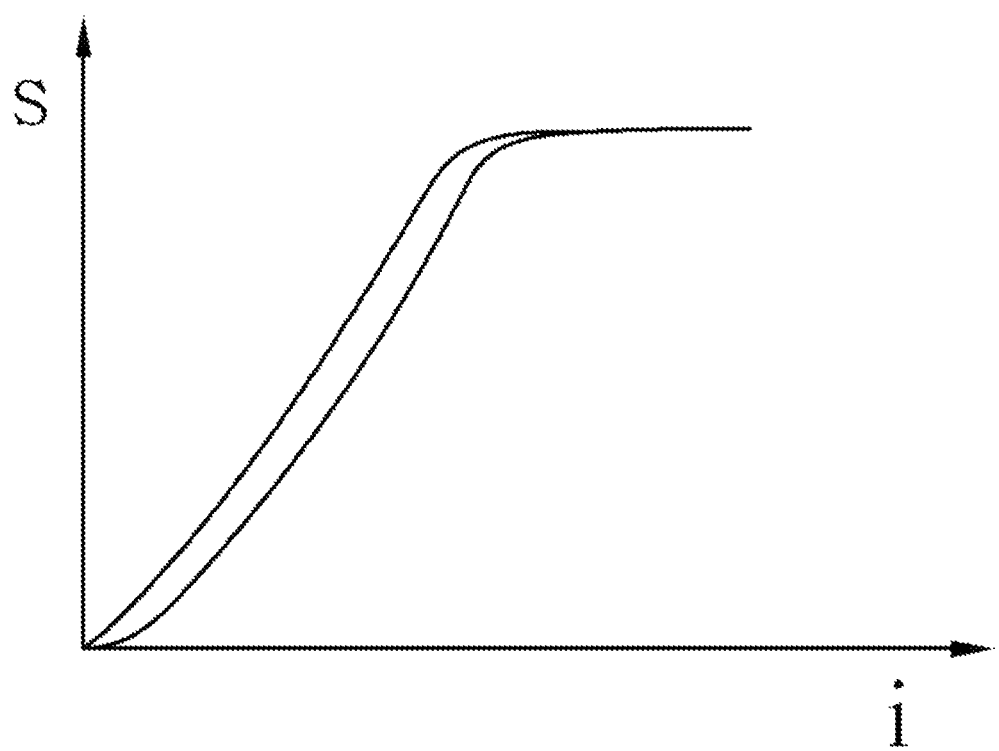
FIG. 12 is a graph showing the operation characteristics of an actuator which moves a movable part to a reference position and then moves it to a target position, according to an embodiment of the present invention.

FIG. 12 is a graph showing the operation characteristics of the actuator which moves the movable part to the reference position and then moves it to the target position, according to an embodiment of the present invention. In the case where a voice coil actuator is used as an embodiment of the actuator, the horizontal axis of FIG. 12 denotes current applied to the coil 500, and the vertical axis denotes an optical-axis-directional displacement of the movable part 210. FIG. 12 shows a hysteresis curve while the movable part 210 that has been moved to the reference position is moved by the actuator between the reference position and the target position.

It can be understood that, unlike the drive characteristics of FIG. 9, because there is no pre-load, a displacement directly occurs without having a threshold section. Furthermore, compared to the case of FIG. 9, the gradient of the hysteresis curve is increased so that the control sensitivity can be enhanced. Therefore, it can be appreciated that variation of the displacement is comparatively large despite low current compared to the case of FIG. 9. In other words, it can be understood that the sensitivity of movement of the bobbin unit 200 with respect to current is improved. This means that, despite using low current compared to the case of FIG. 9, the same displacement can be induced. When the modulus of elasticity the elastic plate 700 is the same, because there is no pre-load, current required to induce the same displacement is lower than the case of FIG. 9. Thereby, the gradient of the hysteresis curve is increased, and the control sensitivity is enhanced.

As a result, power consumption required to drive the actuator can be reduced. High sensitivity of the movable part 210 that is required in work such as taking a close-up picture where minute movement of the movable part 210 is needed can be achieved.

Figure 13:
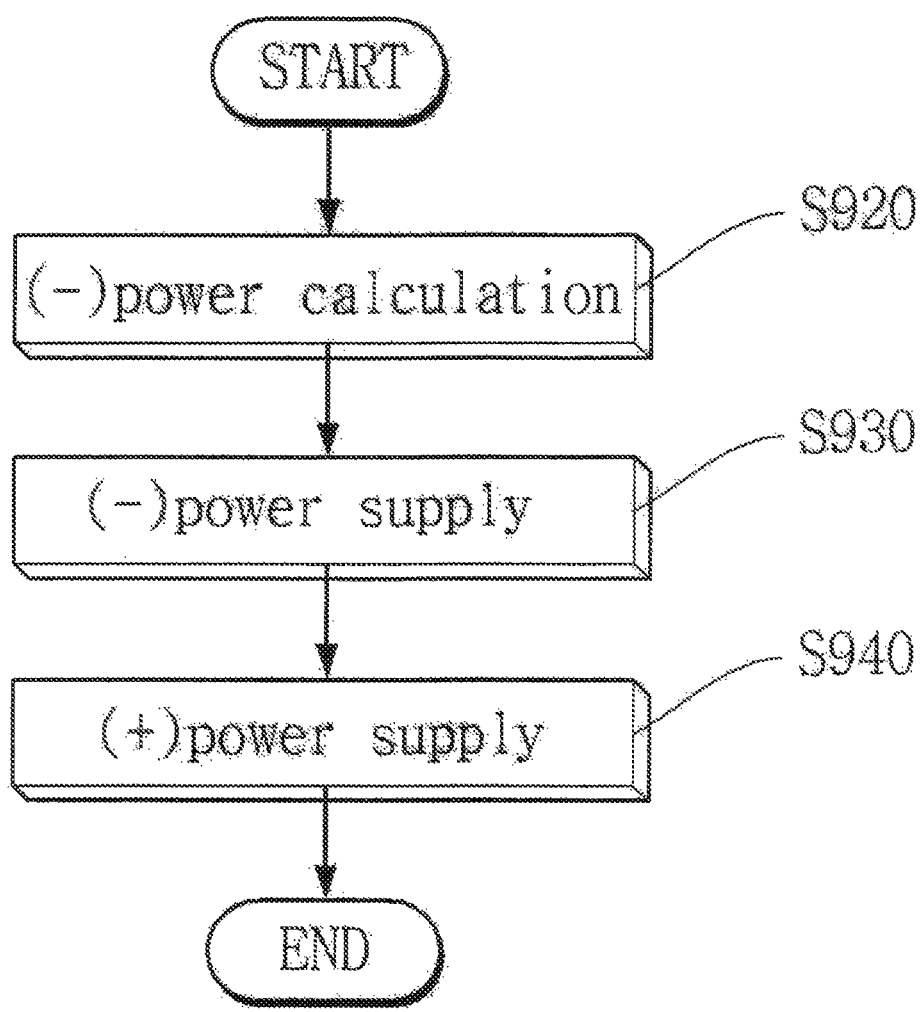
FIG. 13 is a flowchart showing a method of controlling the camera module according to the present invention.

FIG. 13 is a flowchart showing a method of controlling the camera module according to the present invention. The camera module control method can be described with reference to the operation of the camera module that has been described above.

At step S930, negative (−) power is supplied to the actuator which moves the movable part 210 in the direction of the optical axis so that the movable part 210 is moved to the reference position. This is an operation which is conducted in the power unit 410 and is controlled by the control unit 430.

At step S940, positive (+) power is supplied to the actuator so that the movable part 210 that has been moved to the reference position can be moved to the target position.

In an embodiment, the camera module control method may further include, when it is needed to determine the amount of negative (−) power required at the step of supplying the negative (−) power, step S920 of calculating the negative (−) power of the actuator required to move the movable part 210 from the free position to the reference position.

As described above, the present invention provides a camera module which can reliably move a lens in a direction of an optical axis.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A camera module, comprising:
a bobbin unit comprising a stationary part fixed in a base, and a moveable part provided so as to be movable relative to the stationary part, with a lens installed in the movable part;
a suspension unit respectively connected at opposite ends thereof to the stationary part and the movable part, the suspension unit comprising a link unit rotating when the movable part moves relative to the stationary part;
a drive unit moving the movable part relative to the stationary part in a direction of an optical axis of the lens, the drive unit being disposed at a position displaced from the optical axis of the lens to one side at which the link unit is connected to the movable part; and
a pre-load unit applying a pre-load to the movable part in a direction toward the base,
wherein the suspension unit comprises a plurality of suspension units respectively installed at first and second sides of the bobbin unit,
wherein the pre-load unit comprises a magnet and an attraction part inducing an attractive force with the magnet as the pre-load,
and wherein either the magnet or the attraction part is installed on the movable part, and a remaining one of the magnet and the attraction part is installed on the stationary part or the base.

2. The camera module as set forth in claim 1, wherein the drive unit comprises a coil and the magnet installed on the movable part,
wherein terminal units are provided to supply power to the coil,
and wherein the attraction part comprises the terminal units and the magnet of the drive unit and the magnet of the pre-load unit are integrated with each other.

3. The camera module as set forth in claim 1,
wherein the drive unit moves the movable part to a reference position when starting-up, and after the movable part has been completely moved to the reference position, the drive unit moves the movable part to a target position,
wherein a seating portion is formed on the base or the stationary part so that the movable part that has been completely moved to a reference position is placed on the seating portion,
wherein a power unit supplying power to the drive unit is provided,
wherein the power unit applies a first power to the drive unit when the drive unit moves the movable part from a free position to reference position, and the power unit applies a second power to the drive unit when the drive unit moves the movable part from the reference position to a target position,
and wherein the first power and the second power are different from each other in polarity or absolute value.

4. The camera module as set forth in claim 1, wherein a hinge part is provided at each of positions at which opposite ends of the link unit are respectively connected to the stationary part and the movable part, the hinge part comprising a cross-sectional area smaller than a cross-sectional area of the link unit, and
in response to the movable part being moved, the hinge part is elastically deformed.

5. The camera module as set forth in claim 1, wherein the link unit comprises a first link and a second link spaced apart from each other with respect to a direction of an optical axis of the lens, the first link and the second link rotating a same angle when the movable part moves relative to the stationary part.

6. The camera module as set forth in claim 5, wherein a distance between opposite ends of the first link is equal to a distance between opposite ends of the second link.

7. The camera module as set forth in claim 5, wherein an imaginary parallelogram is formed, comprising the first link and the second link as a pair of facing sides and comprising the stationary part and the movable part as another pair of facing sides, so that the movable part maintains a tilting angle relative to the optical axis of the lens constant while moving.

8. The camera module as set forth in claim 5, wherein each of the first and second links comprising a shape of a both-ends supported beam, respectively connected at opposite ends thereof to the stationary part and the movable part.

\* \* \* \* \*